PHOTOELECTRIC CONTROL DEVICE

Filed April 28, 1964

INVENTOR
Tadatsugu Itoh

BY Hill, Sherman, Meroni, Gross & Simpson
ATTORNEY

United States Patent Office 3,336,510
Patented Aug. 15, 1967

3,336,510

PHOTOELECTRIC CONTROL DEVICE

Tadatsugu Itoh, Tokyo, Japan, assignor to Masao Horino, Tokyo, Japan

Filed Apr. 28, 1964, Ser. No. 363,108
4 Claims. (Cl. 317—124)

ABSTRACT OF THE DISCLOSURE

A photoelectric control device having an astable multivibrator activating a blinking light, and a photoelectric conversion element in the circuit of the astable multivibrator to cause the astable multivibrator to function as a monostable multivibrator to turn off the blinking light when a predetermined amount of light strikes the photoelectric conversion element.

This invention relates to a photoelectric control device, more particularly to a photoelectric control device which automatically controls any desired devices in accordance with the brightness of light.

One object of this invention is to provide a simple and accurate photoelectric control device which controls any desired device according to the presence or the strength of light.

Another object of this invention is to provide a photoelectric control device in which an astable multivibrator is formed with two transistors connected to each other and a photoelectric conversion element is connected to the multivibrator to change the oscillation of an oscillator circuit in response to the brightness of light, thereby operating a relay provided in the oscillator circuit.

A further object of this invention is to provide a simple and accurate automatic lamp-blinking device of photoelectric control which holds a lamp switched off in the daytime and automatically turns on the lamp in the night or in the darkness.

Other objects, features and advantages of this invention will become apparent from the following description taken in conjunction with the accompanying drawings, in which.

Figures 1, 2, 3, 4:
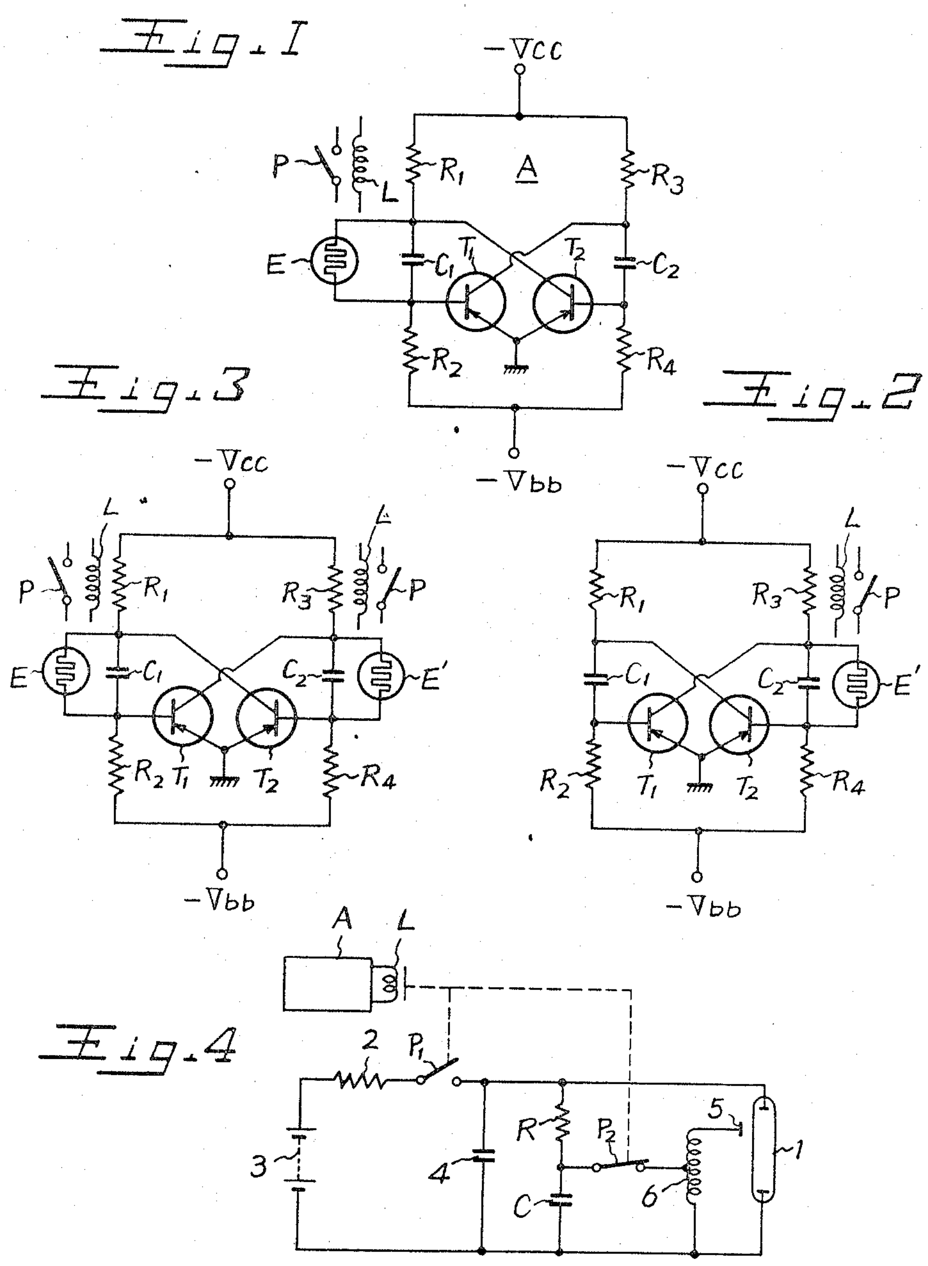
FIGURE 1 is a connection diagram illustrating an example of a photoelectric control device according to this invention.
FIGURE 2 is a connection diagram illustrating another example of the device.
FIGURE 3 is also a connection diagram illustrating a further example of the device.
FIGURE 4 is a connection diagram illustrating an example wherein a flash lamp is controlled by one of the devices shown in FIGURES 1 and 3.

Referring now to the drawing, the present invention will hereinafter be explained. In FIGURE 1, $T_1$ and $T_2$ show PNP type transistors and their emitters are both grounded and capacitors $C_1$ and $C_2$ are respectively connected between the bases and collectors. The both ends of the capacitors are respectively connected to the minus side of a power source through resistors $R_1$, $R_2$ and $R_3$, $R_4$. $R_1$ and $R_3$ are load resistors and $R_2$ and $R_4$ are bias resistors of the transistors. In this case, however, voltages on the collector side and on base side are referred to as $-V_{cc}$ and $-V_{bb}$ respectively and the ground is a plus side. The capacitor $C_1$ is bridged with a photoelectric conversion element E such as cadmium sulfide or the like the resistance value of which varies in accordance with the amount of light projected thereto. In such a case, for example a relay coil L is used in place of the resistor $R_1$ and its contact P is switched, thereby controlling a secondary circuit.

According to the device of this invention, when light is projected to the photoelectric conversion element E, the transistor $T_2$ becomes conductive to energize the relay coil L and its remains non-conductive in the absence of light. Accordingly, the present invention is to provide a kind of a photoelectric control device which actuates according to the presence of light.

Next, the operation of the instant invention will hereinafter be explained. In the absence of light, it may be assumed that the parallel resistor with regard to the capacitor $C_1$ is opened, since the conversation element E has a resistance value of several megohms. If the transistor $T_2$ becomes conductive in the above condition, voltage drop of the resistor $R_1$ becomes large and the capacitor $C_1$ is charged. Then the lower end of the capacitor $C_1$ is more shifted to the plus side and a plus potential is applied to the base of the PNP type transistor $T_1$, making the transistor non-conductive. However, the charge of the capacitor $C_1$ is discharged in accordance with the time constants of the capacitor $C_1$ and the resistor $R_2$ thereby making the transistor $T_1$ conductive. For the same reason, the transistor $T_2$, in turn, becomes non-conductive. Such operation is repeated, so that the whole circuit oscillates as an astable multivibrator. However, when light strikes upon the element E and its resistance value becomes, for example, several hundred ohms, the oscillation ceases and the transistor $T_2$ only remains conductive, while the transistor $T_1$ is held nonconductive and the whole circuit functions as a monostable multivibrator.

The example illustrated in FIGURE 2 is substantially the same as that in FIGURE 1 except in that the element E' is inserted into the collector circuit of the one transistor $T_1$ and a relay coil L is replaced for the resistor $R_3$. In this case only the transistor $T_1$ becomes conductive in the presence of light so that the relay coil L is energized.

In the circuits shown in FIGURE 3, the photoelectric conversion elements E and E' are respectively bridged across both the capacitors $C_1$ and $C_2$. In such a case, when light does not strike upon any of the elements E and E', it corresponds to the case where light does not strike upon the element E in FIGURE 1. When light strikes upon either one of the elements, it corresponds to either one of examples of FIGURES 1 and 2. When light strikes upon both the elements E and E', the two transistors become conductive and operate as a bistable multivibrator.

As has been described above, it will be apparent that the respective circuits exemplified in the foregoing may be applied for various photoelectric control purposes.

FIGURE 4 illustrates an example in which the circuit of FIGURE 1 has been used for blinking control of a discharge tube.

In this embodiment a discharge tube such as a xenon gas discharge tube or the like is automatically controlled to blink at night and to go off with the approach of light or in the day light. A xenon gas discharge tube 1 has two electrodes which are connected to a DC power source 3 through a switch contact $P_1$ and a resistor 2. A capacitor 4 is so connected to be charged from the DC power source. The capacitor 4 is bridged by a series CR circuit the connection mid-point of which is connected to a control electrode 5 of the xenon gas discharge tube through a contact $P_2$ and an auto-transformer 6. The contact $P_1$ and $P_2$ are formed as contacts of a relay L connected to a control circuit A of this invention such as illustrated in FIGURE 1, the contacts operating alternatively. With such arrangement, when light striking upon the element E becomes feebler or disappears with the approach of darkness, for example in the evening, intermittent currents flow in the relay coil L at constant intervals as previously described, for example in FIGURE 1 and hence the contacts $P_1$ and $P_2$ are switched on and off correspondingly. That is, the charge stored in the capacitor 4 is discharged through the discharge tube 1 when the pulse of the control electrode 5 caused in accordance with the discharge of the capacitor C is produced by closing the contact $P_2$. At the next moment the contact $P_1$ closes and the contact $P_2$ opens. Therefore, the capacitor 4 is charged and at the same time the contact $P_2$ opens, thus the discharge tube 1 is turned off. By repeating such operation, the discharge tube may be made to blink at predetermined time intervals at night. When light begins to strike upon the element E, for example in the morning, the relay L remains non-energized so that the above blinking operation is automatically stopped.

According to the present invention, other devices can be controlled accurately and automatically according to the strength or absence of light with relatively simple connections. Especially in a flash pilot lamp or the like such an illustrated in FIGURE 4, its blinking operation can automatically be controlled in response to the presence of light in the daytime and the absence of light at night, and hence any particular operator is not required for such device and further waste of power consumption can be eliminated.

It will be apparent that many modifications and variations may be effected without departing from the scope of the novel concept of this invention.

What is claimed is:

1. A photoelectric control device comprising an astable multivibrator including two transistors and oscillation time constant elements each being inserted between the base of one of said two transistors and the collector of the other of said two transistors, a photoelectric conversion element connected to one of said oscillation time constant elements and varying its electrical resistance in accordance with the intensity of light, and a relay, whereby said astable multivibrator operates as a multivibrator of different oscillation when a certain amount of light strikes upon said photoelectric conversion element to control said relay.

2. A photoelectric control device comprising two transistors, the emitters of said transistors being grounded, a pair of capacitors each connected between the base of one of said two transistors and the collector of the other of said two transistors so as to form an astable multivibrator, a power source for applying suitable voltage to the bases and collectors of the respective transistors, a photoelectric conversion element connected in parallel to one of said capacitors and varying its electrical resistance in accordance with the intensity of light, and a relay inserted into the collector circuit of either one of said transistors, said astable multivibrator operating as an astable multivibrator when no light strikes upon said photoelectric conversion element and functioning as a monostable multivibrator when a certain amount of light strikes upon said photoelectric conversion element, thereby controlling said relay.

3. A photoelectric control device comprising two transistors, the emitters of said transistors being grounded, a pair of capacitors each connected between the base of one said two transistors and the collector of the other of said two transistors so as to form an astable multivibrator, a power source for applying suitable voltage to the bases and collectors of said respective transistors, photoelectric conversion elements respectively connected in parallel to both of said capacitors and varying their electrical resistances in accordance with the intensity of light, and relays respectively inserted into the collector circuits of both of said two transistors, said astable multivibrator operating as an astable multivibrator when no light strikes upon said electric conversion elements and functioning as a bistable multivibrator when light strikes upon said photoelectric conversion elements, thereby controlling said relays.

4. A photoelectric control device as claimed in claim 1 wherein said relay is provided with a control contact of a circuit for blinking a xenon gas discharge tube at a predetermined time interval.

References Cited

UNITED STATES PATENTS

| | | | |
|---|---|---|---|
| 2,891,195 | 6/1959 | Smyth | 315—159 |
| 2,916,670 | 12/1959 | Pederson | 315—209 |
| 3,130,349 | 4/1964 | Mallory | 315—151 |

MILTON O. HIRSHFIELD, *Primary Examiner.*

J. A. SILVERMAN, *Assistant Examiner.*